(12) United States Patent
Ekart et al.

(10) Patent No.: US 6,410,607 B1
(45) Date of Patent: Jun. 25, 2002

(54) GLYCOLYSIS PROCESS FOR RECYCLING OF POST-CONSUMER PET

(75) Inventors: Michael Paul Ekart, Wassenaar (NL); William Speight Murdoch, Jr.; Thomas Michael Pell, Jr., both of Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/478,018

(22) Filed: Jan. 5, 2000

Related U.S. Application Data

(60) Provisional application No. 60/119,447, filed on Feb. 10, 1999.

(51) Int. Cl.$^7$ .................................................. C08J 11/04
(52) U.S. Cl. ........................................ 521/48.5; 521/48
(58) Field of Search ................... 521/48, 48.5

(56) References Cited

U.S. PATENT DOCUMENTS

| | | |
|---|---|---|
| 3,703,488 A | 11/1972 | Morton |
| 3,884,850 A | 5/1975 | Ostrowski |
| 4,609,680 A | 9/1986 | Fugita |
| 5,223,544 A | 6/1993 | Burkett |
| 5,420,166 A * | 5/1995 | Tufts et al. ................ 521/40.5 |
| 5,620,665 A * | 4/1997 | Kubota et al. .............. 422/135 |
| 5,635,584 A * | 6/1997 | Ekart et al. ................ 528/271 |
| 5,750,776 A * | 5/1998 | Harvie et al. ............... 562/483 |
| 5,981,672 A * | 11/1999 | Peterson ...................... 526/64 |
| 6,048,907 A * | 4/2000 | Peterson ................... 521/48.5 |

* cited by examiner

Primary Examiner—Edward J. Cain
Assistant Examiner—Katarzyna W. Lee
(74) Attorney, Agent, or Firm—Susan F. Johnston

(57) ABSTRACT

Disclosed herein is a process for depolymerizing and purifying contaminated post-consumer polyester. In the process, depolymerization is effected by way of glycolysis in an agitated reactor vessel. The process includes the steps of contacting a contaminated polyester with an amount of a glycol to provide a molar ratio of greater than about 1 to about 5 total glycol units to total dicarboxylic acid units at a temperature between about 150 to about 300° C. and an absolute pressure of about 0.5 to about 3 bars. This reaction is conducted for a time sufficient to produce, in the reactor, an upper layer having a relatively low density contaminant floating on top of a lower layer which includes a relatively high density depolymerized oligomer of the polyester, and separating the upper layer from the lower layer. The layers may be separated by removing the upper layer from the reactor in a first stream and removing said lower layer from the reactor in a second stream.

20 Claims, No Drawings

GLYCOLYSIS PROCESS FOR RECYCLING OF POST-CONSUMER PET

REFERENCE TO RELATED APPLICATION

This application claims the benefit of U.S. Provisional Application No. 60/119,447 filed Feb. 10, 1999.

FIELD OF THE INVENTION

The present invention is directed to a novel process for recycling post-consumer polyester. In particular, the process of the present invention involves depolymerization of the post-consumer polyester by way of glycolysis.

BACKGROUND

Polyesters are used to form a wide variety of articles. In order to conserve resources and reduce the amount of pollution resulting from discarded polyester articles, it has become important to recycle discarded polyester articles. Polyester may be recycled by depolymerizing high molecular weight polyester into monomers and oligomers that are then repolymerized to an appropriate molecular weight for formation into new articles. Since discarded polyester may be contaminated with foreign materials, early polyester recycling efforts were geared toward producing relatively low-grade recycled products that do not require high purity polyester. An example of such low-grade product commonly made from recycled polyester is the "fiber fill" used in comforters, coats, pillows, and such. Polyester recycling technology has recently developed to include depolymerization and purification of discarded polyester waste to produce recycled polyester having high purity. High purity recycled polyester is required for sensitive uses such as producing containers for food use.

Recyclable polyester is recovered from two sources, manufacturing waste and polyester articles which have been used and discarded. The latter category is termed "post-consumer waste." Post-consumer polyester waste may contain a variety of foreign materials in addition to materials typically present in a polyester through polycondensation. Examples of such foreign materials include polyesters with different compositions, catalyst metals, colorants, other polymers such as polyvinyl chloride and polyethylene, aluminum, sand, paper, glue, and chemicals or residues absorbed from anything stored in the container. If post-consumer polyester is to be recycled for sensitive applications such as food containers, beverage containers, medical devices, and the like, it is critical that such contaminants are removed from the polyester.

A method of recycling high molecular weight polyester, especially polyethylene terephthalate ("PET"), involves depolymerizing ground or crushed flakes of polyester via glycolysis. This process includes contacting the high molecular weight polyester with a glycol such as ethylene glycol to produce oligomers and/or monomers of the polyester. These materials are subsequently repolymerized as part of the preparation of new polyester articles. In the glycolysis of PET, the scrap PET is reacted with ethylene glycol, thus producing bis-(2-hydroxyethyl) terephthalate ("BHET") and/or its oligomers. Glycolysis is an especially useful reaction for depolymerizing PET due to the fact that the BHET produced can be used as a raw material for both dimethyl terephthalate ("DMT") based and terephthalic acid ("TPA")-based PET production processes without major modification of the production facility. Glycolysis for depolymerizing polyester scrap recovered during various points in the manufacture of polyester articles is described in U.S. Pat. Nos. 3,884,850 and 4,609,680, which are incorporated herein by reference.

U.S. Pat. No. 5,223,544 discloses a process whereby the foreign material present in post-consumer PET is removed by a process of first depolymerizing the polyester in a reactor via glycolysis to provide a mixture of PET oligomers, monomers, and various immiscible contaminants. The reaction mixture is then fed to an unstirred separation device whereby the contaminants are allowed to migrate away from the polyester on the basis of density, thereby forming an upper layer of low density contaminants, a middle layer of polyester material, and a lower layer of high density contaminants. The middle polyester layer is thereafter separated from the contaminants by being removed from the separation device through a draw-off pipe.

Unfortunately, the process of U.S. Pat. No. 5,223,544 requires a bulky separation device. Such devices are undesirable. Additionally, the steps of feeding the reaction mixture to a separate separation vessel and allowing the unstirred mixture to separate requires an unacceptably long residence time. Such long residence time allows for the deleterious formation of an unacceptable amount of diethylene glycol. Diethylene glycol is undesirable since it promotes the production of unwanted copolymer in the recycled PET, and a lengthier process is inherently more inefficient and expensive.

Accordingly, there is a need for a method which will permit the expedient recovery of high quality polyester or its oligomers from waste and post-consumer materials. The present process overcomes these obstacles by providing a simpler and acceptable way for removing contaminants via glycolysis depolymerization of postconsumer polyester, and recovering high quality polyester monomers and/or oligomers acceptable for production of sensitive use articles.

SUMMARY OF THE INVENTION

The polyester depolymerization and purification process of the present invention includes the steps of contacting a contaminated polyester with an effective amount of a glycol to provide a molar ratio of greater than about 1 to about 5 total glycol units to total dicarboxylic acid units at a temperature between about 150 to about 300° C. and an absolute pressure of about 0.5 to about 3 bars. This process is conducted in an agitated reactor vessel for a time sufficient to produce, in the reactor, an upper layer having a relatively low density contaminant floating above a lower layer of a depolymerized oligomer of the polyester. The process further includes separating the layers from each other by removing the upper layer from the reactor in a first stream and the second layer from the reactor in a second stream.

DETAILED DESCRIPTION

The process of the present invention is a simpler and less expensive way of effectively removing contaminants from post-consumer polyester. Surprisingly, it was discovered that separation of contaminants from polyester could be achieved under agitated glycolysis conditions, and that the lower density contaminants form a distinct upper layer in the reactor vessel that can be readily separated from the lower layer containing the remainder of the glycolysis reaction mixture. It was further found that after separating the lower density contaminants from the remainder of the glycolysis reaction mixture, any immiscible contaminants which may have a relatively high density can be effectively removed by filtration or straining. This simple process requires less residence time in the vessel, fewer vessels and reduced costs, thereby producing less unwanted by-products.

The depolymerization and purification process of the present invention comprises contacting a contaminated polyester with an amount of a glycol to provide a molar ratio of greater than about 1 to about 5 total glycol units to total dicarboxylic acid units at a temperature between about 150 to about 300° C. and an absolute pressure of about 0.5 to about 3 bars in an agitated reactor vessel for a time sufficient to form, in the reactor, an upper layer of a relatively low density contaminant floating above a lower layer comprising a depolymerized oligomer of the polyester. As used herein, the term "oligomer" includes both monomers and oligomers of polyester. The present process further includes the step of separating the upper and lower layers by removing the upper layer from the reactor in a first stream and removing the lower layer from the reactor in a second stream. Advantageously, the entire reaction mixture does not need to be transferred to a dedicated separation vessel.

The process of the present invention is useful for recycling polyester. The present process is especially beneficial in recycling contaminated polyester which is used in packaging, preferably food packaging. Such polyesters are generally known in the art and may be formed from aromatic dicarboxylic acids, esters of aromatic dicarboxylic acids, glycol and mixtures thereof More preferably, the polyesters are formed from terephthalic acid, isophthalic acid, 2,6-naphthalenedicarboxylic acid, dimethyl terephthalate, dimethyl isophthalate, and dimethyl-2,6-naphthalenedicarboxylate, ethylene glycol, diethylene glycol, cyclohexanedimethanol and mixtures thereof Besides PET, polyethylene naphthalate (PEN) is a particularly useful polymer for recycling in the present process.

The dicarboxylic acid component of the polyester may contain up to about 50 mole % of one or more modifying dibasic acids. Such modifying dibasic acids include dicarboxylic acids preferably having from about 2 to about 40 carbon atoms, more preferably including aromatic dicarboxylic acids having about 8 to about 14 carbon atoms, aliphatic dicarboxylic acids having about 4 to about 12 carbon atoms, and cycloaliphatic dicarboxylic acids having about 8 to about 12 carbon atoms. Examples of modifying dibasic acids include terephthalic, isophthalic, adipic, glutaric, azelaic, sebacic, fumaric, cis- or trans-1,4-cyclohexanedicarboxylic, the various isomers of naphthalene dicarboxylic acids and mixtures thereof Highly useful naphthalene dicarboxylic acids include the 2,6-, 1,4-, 1,5-, or 2,7-isomers but the 1,2-, 1,3-, 1,6-, 1,7-, 1,8-, 2,3-, 2,4-, 2,5-, and/or 2,8-isomers may also be used. The dibasic acids may be used in acid form or as their esters such as the dimethyl esters for example.

In addition, the glycol component of the polyester may contain up to about 50 mole % of one or more modifying diols. Typical modifying glycols may contain from about 2 to about 10 carbon atoms and include ethylene glycol, propylene glycol, 1,3-propanediol, 1,4-butanediol, 1,6-hexanediol, diethylene glycol, 1,4-cyclohexanediol, 1,4-cyclohexanedimethanol, and the like. The 1,4-cyclohexanedimethanol may be in the cis or the trans form or as cis/trans mixtures.

The post-consumer polyester treated by the depolymerization and purification process of the present invention contains contaminants that may have originated from manufacturing of the end article or from goods stored in or used with the polyester article. Contaminated polyester is defined herein as a polyester material containing, having attached thereto, or admixed with a substance that would be deleterious in the recycling or reuse of the polyester. The present process is especially useful for treating post-consumer polyester contaminated with substances such as polymers other than polyesters, particularly polymers of polyvinyl chloride and polyolefins. Examples of other contaminants effectively removed using the process of the invention include aluminum, sand, paper, glue, and chemicals absorbed and residues from materials stored in the container.

In the present process, post-consumer polyester articles are typically washed and ground into flakes or other particles suitable for rapid dissolution prior to being charged to the glycolysis reactor along with the glycol. The size of the polyester particle fed to the reactor is dependent on the reactor feed system. A system run at atmospheric pressure would have little limitation on the particle size. A preferable particle diameter of polyester charged to the reactor is less than about 1 inch. The present process can be conducted either as a continuous process or as a batch process. A continuous process typically includes the continual or intermittent charge of post-consumer polyester and glycol to the reactor vessel and the continuous or intermittent removal of a stream of the lower layer drained from the reactor. If conducted as a continuous process, the polyester oligomer/monomer in the reactor serves as a solvent to dissolve the high molecular weight polyester flakes so that the glycolysis reaction proceeds at a reasonably rapid rate. Other examples of continuous processes which may be utilized in accordance with the present invention include co-current and counter-current extraction. Such processes are well known to those skilled in the separation art. Of course, if the process is conducted as a batch process, or when initially starting up a continuous process, a solvent may be charged to the reactor to dissolve the polyester flake. It is preferred to use an oligomer/monomer of the polyester as the only solvent. Further, although the post-consumer polyester may contain catalysts which may be adequate to produce an oligomeric mixture at an acceptable rate, transesterification catalysts known in the art such as salts of Mn, Zn, Sb, Ti, Sn, or Ge may be included to increase the rate of glycolysis.

The glycolysis reaction will proceed with most glycols (diprotic alcohols). Desirably, in order to recycle the post-consumer polyester to a purified version of the same polyester species, the glycol used in the glycolysis reaction should be substantially the same glycol upon which the diol component of the post-consumer polyester is based. Therefore, in the preferred process wherein either PET homopolymer or PET copolymer wherein PET is modified as described above with only a minor amount of modifying acid and/or diol units, ethylene glycol, including mixtures thereof, is the preferable glycol for glycolysis.

The post-consumer polyester and glycol are introduced into the glycolysis reactor in amounts sufficient to provide a molar ratio of from greater than about 1 to about 5 total glycol units to total dicarboxylic acid units, preferably a molar ratio of from about 1.5 to about 2.5. It should be understood that the total glycol units include the glycol units incorporated in the post-consumer polyester as well as the glycol charged to the reactor for glycolysis. The proper molar ratio range of glycol to postconsumer polyester is important so that the viscosity of the resulting reaction mixture allows for migration of the lower density contaminants away from the polyester mixture. The viscosity of the reaction mixture should be less than about 1,000 poise, preferably less than about 100 poise, with a viscosity less than about 50 poise being more preferable.

The glycolysis reaction of the present process should be conducted at a temperature between about 150 to about 300°

C., preferably between about 190 and about 250° C. The reaction time should be sufficient to produce an oligomeric material, usually from about 10 minutes to about 4 hours.

It is a critical aspect of the present invention that the low-density contaminants released from the post-consumer polyester during glycolysis be separated from the polyester while still in the reactor, even while maintaining an agitation rate acceptable for promoting glycolysis in the reactor. The reactor agitator is preferably operated to produce a turbulent flow in the reactor. In a continuous process, the low-density materials floating on the surface of the reaction mixture can be continuously or intermittently pulled off of the lower layer by means such as siphoning, vacuuming, absorbing or skimming the upper layer of contaminants off of the relatively high density layer of polyester and/or oligomer. Alternatively, if the build up of lowdensity contaminant materials is small, it may be sufficient to allow an upper layer of low-density contaminants to accumulate until the reaction is stopped. At which point, all of the lower polyester-containing layer would be drained, leaving only the upper layer of low-density contaminants in the reactor to be separately removed from the reactor.

The process of the present invention is preferably conducted as a continuous process wherein at least a portion or stream of the upper layer is continuously or at least intermittently removed from the reactor and a stream of the lower layer intermittently or continuously flows out of the reactor, preferably to a filtration area where solid and relatively high density contaminants are filtered out of the polyester and/or oligomers. Advantageously, the process of the present invention may be used to recycle PET contaminated with a polyolefin such as low density polyethylene (LDPE), linear low density polyethylene (LLDPE), high density polyethylene (HDPE), and ultra-high density polyethylene (UHDPE), and polyvinyls such as polyvinyl chloride (PVC) and polyvinylidene chloride (PVDC).

If contaminants of equal or higher density than the polyester are contained in the post-consumer polyester, these relatively high density contaminants will be released during glycolysis and migrate to the lower layer of the reaction mixture in the glycolysis reactor vessel, and can be removed accordingly. It has been found that essentially all high-density contaminants, which are insoluble in the reaction mixture of the present process, have a particle size larger than about 50 microns. Therefore, these large particles can simply be filtered or strained out of the mixture. Filtration should at least remove particles larger than about 50 microns, and preferably larger than about 1 micron.

If the process of the present invention is conducted continuously and polyester and glycol are continuously fed into a stirred reactor, or extraction vessels, and a stream of polyester material is continuously withdrawn out of the bottom of the reactor, a flake of post-consumer polyester may occasionally get channeled through the reactor without sufficient contact time to depolymerize or dissolve. In such case, the flake would be filtered out of the polyester material along with the high-density contaminants. To avoid losing such polyester as waste material, it may be desirable that the discharge pipe connecting the lower layer discharge point of the reactor with the filtration area be long enough to provide a sufficient residence time to assure dissolution of all post-consumer polyester. Residence time in the pipe is preferably from less than about 1 minute up to about 60 minutes, and more preferably between about 1 minute to about 30 minutes.

Another optional step following separation of the upper layer from the lower layer is the batchwise treatment of the lower layer with from about 0.0001 to about 2 parts of an adsorbent per part of product or continuously over a bed of adsorbent with an empty tube residence time of about 0.01 to about 2 hours. Suitable adsorbents include activated carbon, activated clay, silica, and alumina and mixtures thereof, with activated carbon being preferred.

The depolymerization process of the present invention unexpectedly produces a monomer/oligomer mixture of suitable quality for introduction into a process for the production of high quality polyesters. The major contaminants in the scrap are removed through filtration, floatation, volatilization, or thermal destruction during the process. Containers formed from post-consumer polyester recycled according to the process of the present invention are suitable for food contact.

After treating post-consumer polyester according to the depolymerization and purification process of the present invention, the monomer/oligomer mixture recovered from the lower layer of the glycolysis reactor may optionally be introduced into a second reactor. In this second reactor, excess glycol may be removed from the monomer/oligomer mixture to give the desired degree of polymerization for a product suitable for use as a reactant in repolymerization. Adjustment of the pressure or temperature of the reactor is among the means to control the removal of glycol.

The final purified monomer/oligomer product of the process of the present invention may be stored or transported as a liquid in a heated (if necessary) container. Alternately, it may be solidified by cooling, grinding, and storing and transporting as a solid. The product may be introduced into a polyester production process for repolymerization. Such processes are well known in the art, and include esterification of dicarboxylic acid(s) or transesterification of esters of dicarboxylic acid(s) with diol(s) followed by polycondensation under reduced pressure. The monomer/oligomer product of the process of the present invention can be fed at any desired point in the polyester manufacturing process. Feed rates of the glycolysis product and a virgin raw material cab be adjusted to give a product containing from less than about 1% to 100% post-consumer recycle content polyester. It may further be desirable to add a colorant to the polyester production process to improve the color of the polyester containing post-consumer recycle content. We have found that the catalyst remaining in the recycle material remains active, thus it is possible and preferable to reduce the catalyst fed to the polyester production process by the amount of recycle content being added. For example, for 25% recycle content polyester, it is possible to use 25% less catalyst in the polyester production process than in a process to produce polyester with no recycle content. It may be desirable to feed the pellets from melt-phase polyesterification process to a solid-state polymerization process to further increase molecular weight.

This invention is further illustrated by the following examples, which are merely or the purpose of illustration and are not intended to limit the scope of the invention.

EXAMPLES

Example 1

Post-consumer PET scrap was used to produce PET with 25% recycle content. The scrap primarily contained clear PET. A 1:1 molar ratio of ethylene glycol to post-consumer PET (based on repeat unit) were fed to a glycolysis reactor to provide a total glycol units to total carboxylic acid units of about 2 to 1. The reactants were charge to the reactor at a rate of 32 pounds of PET per hour. The reactor was run at 230° C. and atmospheric pressure. The batch residence time was about 65 minutes. The lower layer of the reaction mixture was transferred through a pipe allowing a residence time of about 20 minutes, and was filtered through a 40-mesh strainer. The depolymerized PET was fed to a first reactor in a DMT-based PET production process at a ratio of one part recycle per three parts DMT, based on moles of terephthalate. Catalyst was added to the process based on the virgin DMT (20 ppm Ti, 55 ppm Mn, 220 ppm Sb, 95 ppm P by weight); that is, the added catalyst was 75% of that used for 100% virgin PET production. No colorants were added. With no significant change in the PET production process conditions, the molecular weight of the product was the same as that of 100% virgin product. Despite variations in comonomer content and catalyst levels in the feed, the process was stable. The color of the resulting recycle content pellets was L*=53.1, a*=−1.4, and b*=7.5.

Example 2

The process in Example 1 was used to produce PET with 25% content from manufacturing scrap (scrap was not contaminated by foreign materials). Process conditions and catalyst additives were as in Example 1. The color of the resulting product was L*=52.9, a*=−2.0, and b*=8.5. Note that the color of the product containing manufacturing scrap is not better than the product with post-consumer PET content in Example 1 (higher L*, indicating more brightness, and lower b*, indicating less yellowness, are considered desirable). This shows that most of the contaminants were removed from the post-consumer PET in Example 1.

Example 3

Post-consumer PET was intentionally spiked with 1000 ppm (by weight) of four contaminants: lindane, diazinon, toluene, and chloroform. These compounds represent nonvolatile nonpolar, nonvolatile polar, volatile nonpolar, and volatile polar substances, respectively. It is unlikely that commercial quantities of post-consumer PET would contain as much as 1,000 ppm of any such contaminant. The contaminated post-consumer PET was depolymerized via glycolysis, and fed to a PET production process to make 100% recycle content PET as described in this invention. The resulting PET was analyzed for the contaminants. The PET was found to contain less than 0.100 ppm of each of these materials. This very efficient removal of contaminants indicates that the process described in this invention produces PET safe for food contact.

Example 4

The continuous process in Example 1 was used to produce PET with 25% content from manufacturing scrap (the scrap was not contaminated). Process conditions and catalyst additives were as in Example 1. High-density polyethylene was added (110 grams) as a contaminant to the manufacturing scrap being fed to the process. After conducting the continuous process for forty-eight hours without removing any of the upper layer from the reactor, the process was stopped, the lower layer was drained, and the upper layer was removed from the glycolysis reactor. The upper layer contained 108 g of polyethylene. No polyethylene was detected in the lower layer PET product. This illustrates that very good separation of the low density contaminants from polyester is attained in the process of the present invention, even when the low density contaminants are allowed to build up under the agitated reactor conditions for a long period of time.

Modifications of this invention will be readily apparent to those skilled in the art and it is intended that all such modifications be included within the scope of the appended claims.

What is claimed is:

1. A depolymerization and purification process comprising:
    (a) contacting a contaminated polyester with an amount of a glycol to provide a molar ratio of greater than about 1 to about 5 total glycol units to total dicarboxylic acid units at a temperature between about 150 to about 300° C. and an absolute pressure of about 0.5 to about 3 bars under agitation in a reactor for a time sufficient to produce, in the reactor, an upper layer comprising a relatively low density contaminant floating above a lower layer including a liquid comprising a depolymerized oligomer of said polyester; and
    (b) separating, while under said agitation, said upper layer from said lower layer by removing said upper layer from the reactor in a first stream and removing said lower layer from the reactor in a second stream.

2. The process of claim 1 wherein said process is conducted as a continuous process.

3. The process of claim 1 wherein said contaminated polyester has a diol component comprising repeat units substantially derived from said glycol.

4. The process of claim 1 wherein said contaminated polyester is polyethylene terephthalate or a copolyester based on polyethylene terephthalate and said glycol is ethylene glycol.

5. The process of claim 1 wherein said upper layer is separated from said lower layer by skimming, siphoning, or vacuuming.

6. The process of claim 1 wherein said contaminated polyester is contacted with an amount of a glycol to provide a molar ratio of about 1.5 to about 2.5 total glycol units to total dicarboxylic acid units.

7. The process of claim 1 wherein said contaminated polyester comprises a dicarboxylic acid component including units selected from the group consisting of terephthalic acid, isophthalic acid, 2,6-naphthalenedicarboxylic acid, corresponding esters thereof, and mixtures thereof; and a glycol component including units selected from the group consisting of ethylene glycol, diethylene glycol, cyclohexanedimethanol and mixtures thereof.

8. The process of claim 1 wherein said upper layer is separated from said lower layer by absorption into another material.

9. The process of claim 1 wherein said lower layer includes a relatively high density contaminant and said process further comprises substantially removing said relatively high density contaminant from said lower layer after said separating said upper layer from said lower layer.

10. The process of claim 9 wherein said relatively high density contaminant is removed from said lower layer by filtering or straining said lower layer.

11. The continuous process of claim 2 further wherein, after being separated from said upper layer, said lower layer is flowed through a pipe for a residence time of about 1 to about 60 minutes.

12. The process of claim 1 wherein said relatively low density contaminant comprises a polymer selected from the group consisting of polyvinyl chloride and polyolefins.

13. The process of claim 1 wherein said agitation produces a turbulent flow within the reactor.

14. A depolymerization and purification process comprising:
- (a) continuously contacting a contaminated polyester with an amount of a glycol to provide a molar ratio of greater than about 1 to about 5 total glycol units to total dicarboxylic acid units at a temperature between about 150 to about 300° C. and an absolute pressure of about 0.5 to about 3 bars under agitation in a reactor thereby producing, in the reactor, an upper layer comprising a relatively low density contaminant floating above a lower layer including a liquid comprising a depolymerized oligomer of said polyester; and
- (b) separating, while under said agitation, said upper layer from said lower layer by removing said upper layer from the reactor in a first stream and continuously removing said lower layer from the reactor in a second stream.

15. The process of claim 14 wherein said upper layer is at least intermittently removed from the reactor.

16. The process of claim 14 wherein said lower layer includes a relatively high density contaminant and said process further comprises substantially removing said relatively high density contaminant from said lower layer after said separating said upper layer from said lower layer.

17. A depolymerization and purification process comprising:
- (a) continuously contacting a contaminated polyethylene terephthalate polyester with an amount of ethylene glycol to provide a molar ratio of about 1.5 to about 2.5 total glycol units to total dicarboxylic acid units at a temperature between about 150 to about 300° C. and an absolute pressure of about 0.5 to about 3 bars under agitation in a reactor thereby producing, in the reactor, an upper layer comprising a relatively low density contaminant floating above a lower layer including a liquid comprising a depolymerized oligomer of said polyethylene terephthalate polyester; and
- (b) separating, while under said agitation, said upper layer from said lower layer by removing said upper layer from the reactor in a first stream and continuously removing said lower layer from the reactor in a second stream.

18. The process of claim 17 wherein said upper layer is at least intermittently removed from the reactor.

19. The process of claim 17 wherein said lower layer includes a relatively high density contaminant and said process further comprises substantially removing said relatively high density contaminant from said lower layer after said separating said upper layer from said lower layer.

20. The process of claim 17 wherein relatively low density contaminant is selected from the group consisting of polyvinyls and poyolefins.

* * * * *